3,471,466
WATER DISPERSIBLE METHYLOLAMIDE PRODUCTS
Lester P. Hayes, 1833 W. Sunset, Decatur, Ill. 62522
No Drawing. Continuation of application Ser. No. 264,069, Mar. 11, 1963, which is a continuation-in-part of application Ser. No. 245,973, Dec. 20, 1962. This application June 5, 1967, Ser. No. 643,367
Int. Cl. C08f 11/00; C08g 9/20; C09j 3/16
U.S. Cl. 260—21
38 Claims

ABSTRACT OF THE DISCLOSURE

Methylol amides of an adduct of a maleyl compound and an aliphatic compound containing an ethylenically unsaturated fatty chain of from 10 to 24 carbon atoms, their preparation and use in paints, warp-sizing compositions, non-woven binders, adhesives, lubricants, etc.

---

This invention relates to a new class of compounds which are methylol amides of adducts formed from alpha, beta-ethylenically unsaturated dicarboxy compounds and ethylenically unsaturated fatty compounds having a chain of at least 10 carbon atoms. More specifically, this invention relates to water-soluble methylol amides of maleated oils, which can be cured by heat to form water-resistant layers.

Various adducts of long chain ethylenically unsaturated fatty materials and alpha, beta-ethylenically unsaturated dicarboxy compounds (the alpha, beta-ethylenically unsaturated dicarboxy compounds are also referred to as "maleyl compounds") have been described. See, for example, U.S. Patents 2,033,131; 2,033,132 and 2,063,540 to Ellis; U.S. Patents 2,188,882-90 and 2,285,646 to Clocker; 2,342,113 to Blair et al.; 2,423,230; 2,455,743 and 2,462,618 to Eilerman; 2,640,814 to Schmutzler; 2,678,934 to Grummit; 2,491,968 to McKenna; 2,967,837 to Greenfield; 3,015,566 to Becker et al.; 3,030,321 to Lombardi; etc. For the most part, these references have been directed principally to the so-called "maleated" or "maleinized" oils.

This application is a continuation of forfeited application Ser. No. 264,069, filed Mar. 11, 1963, which is a continuation-in-part of forfeited application Ser. No. 245,973, filed Dec. 20, 1962.

These products have engendered considerable interest because of the case with which the adducts form, the almost quantitative yields, the availability and low cost of the oils and maleic anhydride, etc.

However, U.S. Patents 2,941,968 and 3,030,321 point out that the prior art products, when dispersed in water with or without other ingredients, were unsatisfactory since the products were unstable in aqueous medium. The unstable materials could not be stored for any great length of time because the dispersed resin component or other vehicle components, such as drying oils, settled out or de-emulsified. Further, films formed from the conventional dispersions were also characterized by a lack of hardness and toughness. Likewise, their resistance to washing and to the action of solvents was unduly low. U.S. Patents 2,941,968 and 3,030,321 considered that these problems could be solved by the free radical addition polymerization of one or more vinylidene monomers with the "maleated" oils or modified "maleated" oils.

The general object of this invention is to provide a new class of compounds which are methylol amides of adducts formed from alpha, beta-ethylenically unsaturated dicarboxy compounds and ethylenically unsaturated compounds having a chain of at least 10 carbon atoms. A somewhat more specific object of this invention is to provide stable water-dispersible methylol amides of adducts resulting from the reacting of ethylenically unsaturated long chain fatty esters, amides, acids or salts and alpha, beta-ethylenically unsaturated dicarboxy compounds, which can be cured to a water-resistant material by heating. A still more specific object of this invention is to provide water-soluble methylol amides of maleated oils which can be cured to a water-resistant, detergent-resistant material by heating.

In one aspect, this invention is a class of fatty compounds, which can be represented by the structure:

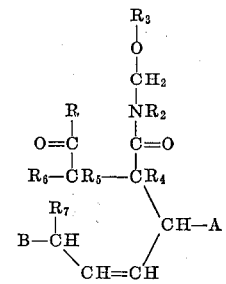

wherein $$B-\overset{|}{C}H-CH=CH-\overset{|}{C}H-A$$

is a divalent aliphatic chain of at least 10 carbon atoms; R is OM, OR$_1$,

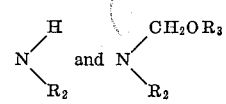

R$_2$ and R$_3$ are hydrogen or alkyl; R$_4$ and R$_5$ are hydrogen, halogen or lower alkyl; R$_6$ and R$_7$ are hydrogen or covalent bonds which taken together, complete a cyclohexene ring; M is a cation.

The above class of compounds can also be represented by the following two structures:

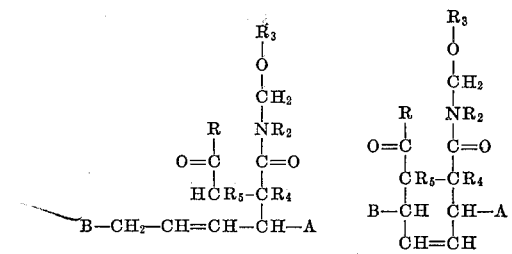

wherein the various symbols are as defined above.

In a second aspect, this invention is a process of making methylol amides which comprises reacting formaldehyde with an amide adduct of an alpha, beta-ethylenically unsaturated dicarboxy compound and an ethylenically unsaturated compound having a chain of at least 10 carbon atoms.

In a third aspect, this invention is a process of providing methylol amides, which comprises the steps of (1) forming an adduct of an alpha, beta-ethylenically unsaturated dicarboxy compound and an ethylenically unsaturated compound having a chain of at least 10 carbon atoms, (2) reacting said adduct with a nitrogen containing basic material and then (3) reacting the reaction product of step (2) with formaldehyde to form a methylol amide.

In a fourth aspect, this invention is an aqueous dispersion of a methylol amide adduct of an alpha, beta-ethylenically unsaturated dicarboxy compound and an ethylenically unsaturated long chain fatty compound having a chain of at least 10 carbon atoms.

In another aspect, this invention is a process of forming water-resistant coatings which comprises applying an aqueous solution of a methylol amide described in the preceding paragraphs to a substrate and heating the applied coating to cure it.

In the description that follows, a variety of methylol amide adducts are described. All of these products can be used interchangeably with more or less success when the utility of the compound is based principally upon the physical properties of the methylol amide and not upon how the methylol amide adduct cures or the actual properties of the cured methylol amide adduct. For example, the adducts of this invention are useful in warp sizing compositions because of their lubricating action and in varous emulsions because of their dispersing properties. On the other hand, the versatile and useful methylol amides of this invention are dependent upon the final properties of the cured methylol amides, such as water-resistance, detergent resistance, organic solvent resistance, tensile strength, freedom from tack, etc. Inasmuch as one of the principal objects of this invention is to provide water-soluble methylol amide adducts whose cured products form water-resistant, detergent resistant materials, the description that follows emphasizes the method for providing methylol amides of this type.

In the description that follows the words "dispersing" and "dispersion" are used in a generic sense to be inclusive of the words "suspending," "dissolving," "suspension" and "solution." The words "ammonia" and "ammonium hydroxide" are useful interchangeably. The term "formaldehyde" is used in a generic sense to be inclusive of monomeric formaldehyde and formaldehyde-generating materials.

REACTION MECHANISM AND PRODUCTS

Inasmuch as the various reactions taking place in the processes of this invention are relatively complex and since the reaction products themselves are dependent upon the choice of reactants, it is advisable to consider first the stepwise reaction of the ethylenically unsaturated fatty material with the preferred alpha, beta-ethylenically unsaturated dicarboxy compound (maleic anhydride), the preferred source of basic nitrogen (ammonia or ammonium hydroxide) and the preferred source of formaldehyde (monomeric formaldehyde). The reasons why these materials are preferred will become apparent later in the specification.

In accordance with the invention, heating of a long chain fatty ethylenically unsaturated compound, such as soybean oil or linseed oil, with a maleyl compound, e.g., maleic anhydride, results in an addition reaction between the ethylenic group of the dicarboxy compound and the hydrogen atom alpha to an ethylenic group in the long chain fatty compound. In this reaction, the ethylenic group of unsaturated dicarboxy compound becomes saturated while the double bonds of the long chain fatty compound remain unsaturated. For example.

Equation I

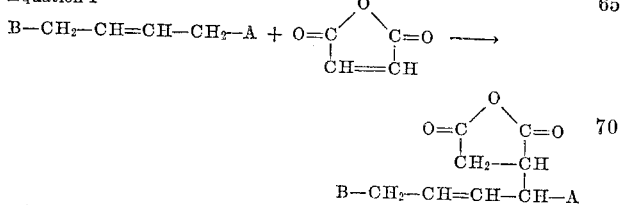

In the event that conjugated unsaturated long chain fatty compounds such as tung oil or compounds capable of isomerizing under reaction conditions to give conjugation (such as soybean oil or linseed oil), are present, a Diels-Alder type of reaction also occurs. For example, Equation II

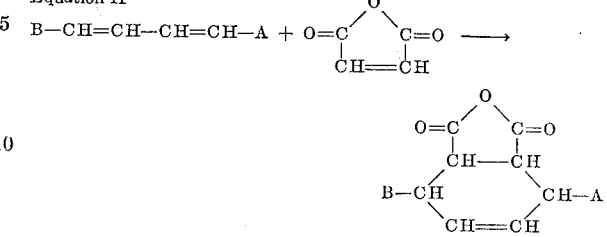

Both types of reaction are herein termed addition reactions or adduct reactions since neither involves removal of water. This step is also referred to herein as the maleation step. Other reactions may occur to a limited extent and are not precluded.

The adducts are then converted to the amide form by reaction with a basic nitrogen compound, e.g., ammonia. For example,

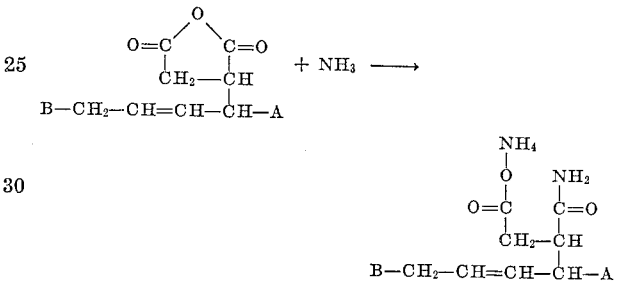

When an anhydride is employed as the ethylenically unsaturated dicarboxy compound or an anhydride is formed during the maleation reaction, the anhydride ring of the adduct may be opened by boiling the addition products with water. Subsequently, the free carboxylic acid groups can be neutralized with certain compounds containing a basic nitrogen atom sometimes referred to hereafter as "basic nitrogen compounds." The resultant products are water-dispersible. If the starting long-chain fatty compound contains free carboxylic acid groups, these groups will also be converted to amide and ammonium salt groups. This step is referred to as the amide-forming step.

The amide adducts are then reacted with formaldehyde, preferably in aqueous solution, to form methylol amide groups. At the same time the ammonium ions in the aqueous solution are converted to various amide-aldehyde products, such as hexamethylene tetramine. This side reaction causes the reaction product to become acidic. If sufficient formaldehyde is added to the reaction product, the methylol amide adduct precipitates from the aqueous medium.

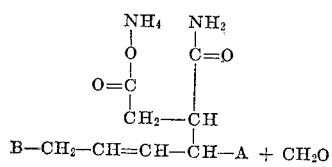

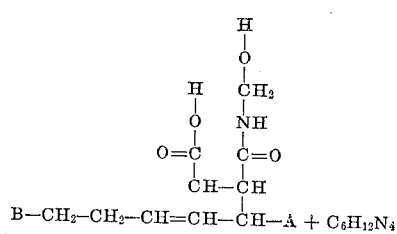

The methylol amide adduct, if precipitated, is then redispersed by the addition of additional ammonia. The free carboxyl groups of the methylol amide are thereby converted again to the ammonium salt form.

THE LONG CHAIN ETHYLENICALLY UNSATURATED COMPOUND

In somewhat greater detail, the divalent aliphatic group $$B-\overset{|}{C}H-CH=CH-\overset{|}{C}H-A$$

can obtain various other groups such as carboxyl groups, halo groups, acyloxy groups, alkoxy groups, aryloxy groups, tertiary amino or quaternary ammonium groups, etc. The preferred long-chain ethylenically unsaturated compounds of this invention are the readily available naturally occurring polyunsaturated glyceride oils (which are considered as having carboxylate groups) having from 10 to 24 carbon atoms in the unsaturated long chain, such as soybean oil, corn oil, cottonseed oil, hempseed oil, tung oil, oiticica oil, safflower oil, peanut oil, linseed oil, tobacco seed oil, cod oil, herring (or menhaden) oil, dehydrated castor oil, etc. The glyceride oils and the esters of other unsaturated long chain acids, such as the linoleic acid esters of trimethylol propane and tall oil fatty acid esters of pentaerythritol, are preferred since they contain a relatively large number of ethylenic double bonds available as sites for adduct formation. In general, those compounds having on an average at least two and preferably three to nine ethylenically unsaturated groups per molecule are preferred. As may be apparent from the aforementioned discussion, two conjugated ethylenic double bonds (see Equation II) are equivalent to only a single unconjugated ethylenic double bond (see Equations I and II) since two conjugated double bonds and the single unconjugated double bond each serve as a single site for adduct formation.

Instead of the glycerides, various tertiary amines, quaternary amines and amides having a plurality of long-chain unsaturated radicals also offer the advantage of plural unsaturation, but at a relatively high cost. As explained below, the various properties of the methylol amide adducts of this invention are dependent upon the average number of methylol amide groups and carboxylate salt groups formed in the fatty molecule amide groups the higher the concentration of methylol amide groups and carboxylate salt groups in the fatty molecule, the better the film properties (tensile strength and solvent resistance) of applied coatings based on the compounds of this invention. These methylol amide groups and carboxylate salt groups are sometimes referred to below as potentially reactive carboxy groups. This term also includes the free carboxylic acid group, the anhydride group and the amide group, but does not include esterified carboxy groups. The number of potentially reactive carboxy groups also controls the dispersibility of the methylol amide adducts in aqueous ammonium hydroxide. Generally, the methylol amides based on fatty compounds having a plurality of long-chain unsaturated fatty radicals are soluble in ammoniacal solutions if the methylol amide adduct contains on an average at least about 1 potentially reactive carboxy group per each long chain fatty radical of from 10 to 24-carbon atoms.

Fatty acids, such as oleic acid, linoleic acid and linolenic acid, and salts thereof are only somewhat less preferred than the above esters. While these fatty compounds do not contain as many sites for adduct formation as the above esters, the presence of the free acid group or salt group compensates to some extent for the smaller number of potential adduct sites. The methylol amide adducts formed from these compounds have excellent properties as additives to yarn sizing compositions. In some cases, it is desirable to employ mixtures of methylol amide adducts derived from both fatty acids and the above esters, particularly the glyceride esters, in order to give the cured methylol amides additional desirable properties, such as increased flexibility and better elongation.

The N-unsubstituted amides of acids, such as linoleic acid, linolenic acid and oleic acid, are quite similar to the acids of the preceding paragraph except that they are somewhat more expensive. However, this is compensated for by the fact that a substantial number of the carboxy groups of the starting fatty amide are converted to methylol amide groups in the process of this invention while only a relatively small proportion of the carboxy groups of the fatty acids and salts thereof are converted to the methylol amide form.

The following are representative of other ethylenically unsaturated compounds, which can be used in this invention: 1-chlorodecene-4; 1-bromooctadecene-9; 1-chlorotetracosene-9; 1 - nitrilooctadecene; N,N-dimethyl-linoleamide; N,N-linoleimide; N,N-linolenimide; N,N-dimethyl - N,N-dilinoleylamine; N-methyl-N,N-dilinoleylamine; 10-carboxyldecene-2; 1-acetoxyoctadecene-4; 1-phenoxyoctadecene-9; 1-propoxyoctadecene-9; etc.

When the divalent group $$B-\overset{|}{C}H-CH=CH-\overset{|}{C}H-A$$

of the methylol amide adduct is substituted by a carboxylate group, the substituent can be represented by the formula:

$$-\overset{O}{\overset{\|}{C}}O-Z(O\overset{O}{\overset{\|}{C}}R_8)_n$$

wherein Z is the residue of a hydroxyl compound, $n$ is a number from 0 to 5, and each $R_8$ is independently a group selected from the class consisting of hydrogen, monovalent aliphatic groups having from 1 to 24 carbon atoms and monovalent aromatic groups having from 6 to 18 carbon atoms.

The alcohols from which Z in the preceding formula may be derived contain from 1 to 6 hydroxyl groups and from 1 to 24 carbon atoms. They may be open chain compounds such as glycerol and sorbitol or cylic compounds such as 1,4-p-dimethylolcyclohexane. Among the suitable monohydric alcohols are methanol, ethanol, octadecanol, etc. Among the suitable dihydric alcohols are ethylene glycol, hexamethylene glycol, and the polyoxyalkylene gycols in which the oxyalkylene groups have 1 to 4 carbon atoms, i.e. the polyoxymethylene glycols, the polyoxyethylene glycols, the polyoxypropylene glycols, etc. Additional suitable higher polyhydric alcohols are pentaeythritol, arabitol, mannitol, trimethylol propane, trimethylol ethane, trimethylol methane, inositol, etc.

Suitable esters may also be obtained from aromatic hydroxy compounds such as phenol, the cresols, resorcinal, hydroquinone, naphthol, etc.

In some cases it may be desirable to increase the functionality of the ester compounds by linking two or more fatty molecules together. This can be accomplished by reacting a dicarboxylic acid, such as adipic acid or its anhydride, with a suitable amount of diglyceride. Alternatively, naturally occurring glyceride oils may be first disproportionated with a polyol, such as pentaerythritol or trimethylolpropane, and then the available hydroxyl groups reacted with polyfunctional reagents, such as adipyl chloride, toluene-2,4-diisocyanate, phosphorous oxychloride, etc.

THE MALEYL COMPOUND OR ALPHA, BETA-ETHYLENICALLY UNSATURATED DICARBOXY COMPOUND

While a wide variety of alpha, beta-ethylenically unsaturated dicarboxy compounds, such as maleic acid, fumaric acid, dimethyl maleate, dibutyl maleate, monomethyl hydrogen maleate, mono-2-ethylhexyl hydrogen maleate, citraconic acid, citraconic anhydride, itaconic acid, itaconic anhydride, ethyl maleic acid, maleimide, maleamic acid, etc., can be used in this invention, maleic anhydride is the preferred dicarboxy compound because of (1) its low cost (2) the ease with which it forms adducts in almost quantitative yields and (3) the high concentration of amide groups which result from the reaction of the anhydride adduct with a basic nitrogen compound. Maleic anhydride is decidedly superior to all of the above compounds. For example, maleic acid, which forms the anhydride under the maleation reaction condition, is twice as expensive as maleic anhydride; and fumaric acid, which approaches the cost of maleic anhydride on a weight basis, requires considerably more severe reaction conditions to form an adduct in lower yields. Further, adducts prepared from free dicarboxylic acids that are not capable of forming an anhydride under the conditions of the maleation reaction, and from half-esters and diesters contain a lower concentration of amide groups after treatment with a suitable basic nitrogen compound than adducts containing the same concentration of carboxy groups in the anhydride form. It goes without saying that diesters are only suitable in this invention when at least some of the carboxy groups in the diester adduct are saponified during or before the addition of the basic nitrogen compound. Citric acid and malic acid which form alpha, beta-ethylenically unsaturated dicarboxy compounds under the conditions of the maleation reaction can also be used in this invention.

THE BASIC NITROGEN COMPOUND

Ammonia, which can be employed as gaseous ammonia or in the aqueous ammonium hydroxide form, is the preferred basic nitrogen compound because of its low cost, availability, high vapor pressure in water, the ease with which it forms amides and the ease with which its amides form methylol groups. Various primary amines; such as methyl amine, ethyl amine and butyl amine; primary and secondary polyamines; such as ethylene diamine, diethylene triamine, propylene diamine and N,N'-dimethyl-ethylene diamine; can be used to partially or completely replace ammonia. All of these amines contain at least two active hydrogen atoms which may be bonded to the same or to different nitrogen atoms in the same molecule.

FORMALDEHYDE SOURCE

Formaldehyde, generally as Formalin, is the preferred source of formaldehyde. Polymeric forms of formaldehyde, such as trioxane and paraformaldehyde, are decidedly inferior to formaldehyde. These polymeric forms must be employed at much higher temperatures than the monomeric formaldehyde. Of course, the polymeric form is equivalent to the monomeric form if it is first converted to the monomeric form before addition to the amide adducts. If inhibited Formalin, which contains methanol, is employed some of the $R_3$ groups will be methyl groups. Reaction products of formaldehyde with basic nitrogen compounds of the preceding paragraph are generally poorer than if the individual reactants are added. Condensates of this type, such as hexamethylene tetramine, are not suitable as a source of both formaldehyde and ammonia in the absence of water. Even in those cases where ammonia has been employed to form the amide prior to the addition of hexamethylene tetramine, higher temperatures are required to form the desired methylol amide than when monomeric formaldehyde is used. Further, the methylol amide products prepared with formaldehyde condensation products are inferior in many end uses to the methylolamide products prepared from monomeric formaldehyde, particularly where a water-insoluble, detergent resistant coating is desired. Other things being equal, it has been found that films cast from methylol amides prepared by reacting maleated oil with hexamethylene tetramine absorb water (are swelled by distilled water) when immersed for 2 or 3 hours whereas films cast from methylol amides prepared in the preferred manner do not swell or absorb water.

NEUTRALIZING BASE

Any of the aforementioned basic nitrogen compounds (ammonia, primary monoamines, primary polyamines or secondary polyamines), secondary amines such as diethylamine, morpholine; tertiary amines such as triethyl amine, methyl diethanol amine; quaternary amines such as tetramethyl ammonium hydroxide; inorganic bases, such as sodium hydroxide or potassium hydroxide, can be employed to neutralize the methylol amide adducts. The choice of neutralizing base has a decided effect on the properties of the cured methylol amide adducts. For example, other things being equal, cured films prepared from methylol amides, neutralized with a volatile base, particularly ammonia, have better resistance to water, dilute alkali, and organic solvents than films made from methylol amides neutralized with a non-volatile inorganic alkali, such as sodium or potassium hydroxide.

MALEATION STEP

In somewhat greater detail the maleation step is carried out by reacting the long chain ethylenically unsaturated fatty compound and the alpha- beta-ethylenically unsaturated dicarboxy compound at a temperature of about 150° C. to 300° C. The long chain fatty compound and the dicarboxy compound can be mixed together and heated to the desired reaction temperature. Alternatively, the dicarboxy compound can be added in increments to the long chain fatty material while the latter is maintained at the desired reaction temperature. The continuous addition method is preferred because it is easier to control and reproduce, particularly when maleic anhydride is employed. When a batch method is employed using maleic anhydride, the batch temperature must be carefully controlled in order to prevent foaming and sublimation of the maleic anhydride. When the continuous addition method is used the rate at which maleic anhydride is added can be adjusted so that there is little or no refluxing.

This reaction may be carried out at atmospheric pressure in an open vessel or under pressure in an autoclave. Maleic anhydride forms an adduct in almost quantitative yields in an open vessel and accordingly sealed reactors are not necessary. For example, when maleic anhydride was reacted with soybean oil in a 3-mole-to-1-mole ratio at from about 230–250° C., an average of 97.4% of the maleic anhydride was converted to the adduct. At a temperature of about 180–210° C., an average of 88.6% of the maleic anhydride was converted to the adduct. Other dicarboxy compounds, which are less efficient adduct formers, give higher yields when a sealed system is employed. For example, dibutyl maleate, which yields the desired adduct in about 30–40% of the theoretical yield in an open reactor, can be converted to the desired adduct in considerably higher yields by carrying out the reaction under pressure.

The efficiency of the maleation reaction of maleyl compounds, such as dibutyl maleate, with non-conjugated polyunsaturated materials can also be increased by providing an isomerization catalyst for the long chain polyunsaturated fatty material, i.e., a catalyst which converts two non-conjugated double bonds, such as in linoleates, to a conjugated diene system. In such case the maleation reaction is primarily a Diels-Alder type addition. A combination of pressure and fatty isomerization catalyst is usually the best means of increasing the efficiency of adduct formation between non-conjugated long-chain polyunsaturated compounds, particularly linoleic and linolenic acid esters, and the less efficient dicarboxy compounds.

The isomerization of two unconjugated ethylenic double bonds in linoleates also takes place without any isomerization catalysts during the maleation reaction. For example, when maleic anhydride is reacted with a glyceride oil rich in linoleates, such as soybean oil and linseed oil, approximately one-third of the adducts formed seem to be by Diels-Alder addition. The number of adducts formed by Diels-Alder reaction can be calculated by determining the number of ethylenic double bonds in the starting long-chain fatty material and in the final product. As explained above (see Equation No. II) an ethylenic double bond in the fatty material is lost each time a Diels-Alder adduct forms while no loss of unsaturation accompanies the formation of the principal adduct formed according to Equation I.

The ratio of alpha, beta-ethylenically unsaturated dicarboxy compound to ethylenically unsaturated long chain fatty compound in the reaction vessel can range from about 0.1 to 2 moles or more of dicarboxy compound per equivalent of unsaturation in the unsaturated long-chain fatty compound depending upon the choice of reactants and the desired properties of the products. For example, the preferred naturally occurring glyceride oils, such as soybean oil or linseed oil, can be reacted with from about 5% to 45% by weight of maleic anhydride to form adducts containing from about 0.5 to 4.5 maleic anhydride moieties per molecule of glyceride oil. (The resulting maleic anhydride portion of the glyceride oil adduct comprises from about 5% to 33% by weight of the product.) The properties of the various members vary as follows, depending upon the level of maleation.

Maleated glyceride oils, which contain in excess of about 5% by weight maleic anhydride or about 0.5 mole of anhydride per mole of glyceride oil, form stable suspensions in aqueous ammonium hydroxide while those containing in excess of about 14% by weight maleic anhydride or about 1.5 moles of anhydride per mole of glyceride oil are soluble in aqueous ammonium hydroxide. Methylol amides at the same level of maleation have essentially the same dispersibility characteristics in aqueous base as the anhydride adduct from which the methylol amide is formed. Other things being equal, thin layers of fully cured glyceride oil methylol amides vary as the level of maleation increases as follows:

suited particularly for use as non-woven binders for wiping cloths (industrial dirt-catching cloths). The methylol amides based upon unsaturated fatty acid esters of polyhydric alcohols containing a total of about 4 to 9 potentially reactive carboxy (carboxylate salt and methylol amide) groups per molecule (preferably about 5–7) are particularly useful as the vehicle in organic solvent-resistant, detergent-resistant coatings.

It has been found that the addition of about 1% by weight water, based on the weight of the long-chain fatty material and the dicarboxy compound results in a lighter-colored product.

AMIDE FORMATION

The maleated adduct of the preceding section can be converted to the amide by a variety of techniques. For example, an anhydride adduct, such as that resulting from the maleation of a naturally occurring glyceride oil and maleic anhydride or maleic acid, can be converted to the amide form in any of the following ways: (1) stirring the anhydride adduct in an atmosphere of ammonia until the exothermic reaction ceases, (2) adding concentrated ammonium hydroxide (28% aqueous solution, for example), to the anhydride adduct and stirring until the adduct disperses, (3) adding the anhydride adduct to concentrated ammonium hydroxide and stirring until the adduct disperses, (4) mixing the anhydride adduct with a calculated amount of water and then bubbling a sufficient amount of ammonia gas into the system to disperse the anhydride adduct, (5) mixing the anhydride adduct with a calculated amount of water, opening the anhydride ring by heating and then adding ammonia gas or aqueous ammonium hydroxide to disperse the adduct.

It has been found that adding the anhydride adduct to concentrated ammonium hydroxide yields the highest concentration of amide groups. For example, when the above illustrative anhydride adduct (glyceride oil and maleic anhydride) is added to a concentrated aqueous ammonium hydroxide solution containing two molecules of ammonium hydroxide per anhydride group in the adduct, about 85% of the anhydride groups (42.5% of the carboxyl groups) are converted to monoamide groups. The remainder of the ammonium hydroxide is present as the ammonium salt. The concentration of amide groups can be determined by determining the concentration of non-volatile nitrogen. On the other hand when the ammonium hydroxide is added to the adduct in the same proportions, about 60% of the anhydride groups (30% of the potentially reactive carboxy groups) are converted to monoamide groups. About 30% of the anhydride groups (15% of the potentially reactive carboxy groups) are converted to monoamide groups when concentrated ammonium hydroxide is added to the anhydride adduct

TABLE I

| Average total number of potentially reactive carboxy groups per molecule of glyceride oil: | Maleate moieties per molecule of glyceride oil | Weight percent of maleic anhydride in the methylol amide precursor | Properties of cured layer |
| --- | --- | --- | --- |
| 1 | 0.5 | 5 | Sticky, oil-like. |
| 2 | 1.0 | 10 | Tacky material without strength. |
| 3 | 1.5 | 14 | Soft, oily, water-resistant film having low strength. |
| 3.7 | 1.85 | 17 | Soft, oily, water-resistant film having fair strength. |
| 5 | 2.5 | 22 | Water-resistant film having good strength and solvent resistance. |
| 6 | 3.0 | 24.5 | Tough, flexible, solvent resistant film. |
| 8.7 | 4.35 | 33 | Hard, brittle film. |

In general, methylol amides having the same total number of carboxylate salt groups and methylol amide groups (potentially reactive carboxy groups) per molecule will cure to products having essentially the same characteristics, provided the methylol amides are prepared in the same way and cured in the same way. For example, a cured methylol amide based upon the reaction product of a half-ester of maleic acid and a glyceride oil, which has three half-esterified maleate moieties per molecule of glyceride oil, has essentially the same properties as a methylol amide based upon a glyceride oil containing 1.5 unesterified maleate moieties per molecule. Each of these methylol amides contain a total of three potentially reactive carboxy groups.

The methylol amides based upon unsaturated long chain carboxylic acid esters of polyhydric alcohols containing a total of from about 2 to 4 potentially reactive carboxy groups (carboxylate salts and methylol amide groups) per molecule (preferably about 3 to 4) are in a ratio of one molecule of ammonium hydroxide per anhydride group.

Still lower yields of amide are obtained if the anhydride ring is opened prior to the addition of ammonium hydroxide. For example, when the anhydride ring of the same adduct is first broken by heating with water, the addition of ammonium hydroxide to the adduct (in a ratio of one molecule of ammonium hydroxide per anhydride ring) produces only 15% of amide-containing groups (7.5% of the carboxy groups).

An adduct of a dialkyl maleate, such as dibutyl maleate, can be converted to the amide form by saponifying off one or both of the alkyl groups followed by the addition of gaseous ammonia or aqueous ammonium hydroxide. However, the dialkyl maleate adducts are preferably converted to the amide form by ammonolysis. Ammonolysis techniques are useful for introducing a reproducible specific number of amide groups into an adduct. Of course such techniques are considerably more expensive than the preferred anhydride route.

Adducts based on half-esters of maleic acid may be (1) subjected to saponification followed by the addition of ammonia or (2) subjected to ammonolysis or (3) simply mixed with ammonium hydroxide. If the half-ester structure is maintained, cured products based on said half-ester adducts have properties similar to adducts containing the same number of potentially reactive carboxy groups.

Adducts based on alpha, beta-ethylenically unsaturated imides, such as maleimide, or upon alpha, beta-ethylenically unsaturated amides, such as maleamic acid, may be suspended or dissolved in water or aqueous ammonium hydroxide in order to be in a suitable state for the addition of formaldehyde. If desired, these materials or the other amide adducts may be dispersed in organic diluents or solvents such as ethanol, acetone, carbon tetrachloride, etc.

As explained above, in the preceding section the combined number of carboxylate salt groups and methylol amide groups (potentially reactive carboxy groups) per molecule of fatty material has a pronounced effect on the cured methylol amides of this invention. However, the ratio of amide groups to carboxylate salt groups has less effect on the cured methylol amides than the total of potentially reactive carboxy groups. For example, cured methylol amides based upon glyceride oil adducts having on an average 0.9 amide groups and 5.1 carboxylate salt groups per molecule have properties quite similar to cured methylol amides based upon glyceride oil adducts having on an average from about 1.8 to about 2.6 amide groups and correspondingly 4.2 to 3.4 carboxylate salt groups (6 potentially reactive carboxy groups) per molecule. Other things being equal, while all of these products can be cured by heat to form water-resistant coatings, the latter products have somewhat better detergent resistance, solvent resistance and higher tensile strength. Accordingly, products having higher ratios of amide groups to carboxylate salt groups are preferred. However, even those products having lower ratios of amide groups to carboxylate salt groups form methylol amides having excellent properties as paint primers, etc.

METHYLOL AMIDE FORMATION

The amide adduct of the preceding section, which has preferably been dispersed in water, is then reacted with formaldehyde or a compound capable of generating formaldehyde, preferably by adding the formaldehyde source (usually formalin or paraformaldehyde depolymerized to the monomeric form) to the amide adduct or by adding the amide adduct to the formaldehyde source. This reaction can be carried out in a sealed vessel or in an open vessel. Generally, it is preferred to carry out this reaction at moderate temperature (5° C. to 75° C.) in an open vessel.

As pointed out above, a principal object of this invention is to provide a series of water-dispersible methylol amide adducts which can be cured by heat to form water-resistant, detergent-resistant materials. In order to form materials of this type, a sufficient concentration of formaldehyde is added to the aqueous amide adduct composition to provide at least about 0.7 mole of formaldehyde per each equivalent of nitrogen containing compound bearing a nitrogen atom bonded directly to hydrogen (each N—H group) in the aqueous composition, thereby converting free ammonium ions, primary amine groups, etc. to methylol amine groups. Excellent results have been obtained by adding at least about 0.8 mole of formaldehyde for each mole of basic nitrogen containing compound, which contains two hydrogen atoms bonded directly to nitrogen, used to form the amide, as set forth in the preceding section. In this way essentially all the ammonium ions, etc. in the reaction medium are converted to non-volatile nitrogen and the methylol amide adduct is precipitated from the aqueous reaction medium as a water-insoluble hydrate. This frequently has a dough like consistency. The formation of this precipitate is visual evidence that a sufficient concentration of formaldehyde has been added to the amide aduct.

Less than 0.8 mole of formaldehyde per each mole of basic nitrogen compound, which contains two hydrogen atoms bonded directly to nitrogen, used to form the amide, as set forth in the preceding section, will precipitate the methylol amide if the basic nitrogen compound used to form the amide is volatile and some or all of the volatile material is lost or distilled from the aqueous amide adduct composition prior to the addition of formaldehyde.

While the formation of a methylol amide precipitate is an excellent means of determining whether the methylol amide will have the most advantageous curing properties, large-scale production of the product is facilitated by maintaining the methylol amide in solution during the addition of the formaldehyde. Precipitation of the methylol amide from the aqueous reaction mixture can be avoided without sacrificing any of its curing properties by adding a basic material, which does not react with formaldehyde, to the adduct prior to or at the same time as the formaldehyde is added. For example, a volatile tertiary amine, such as trimethyl amine or triethyl amine, can be added to the adduct for this purpose, as can sodium carbonate, tetramethylammonium hydroxide, or the like. This basic material buffers the methylol amide solution so that the methylol amide is less prone to precipitate. Generally, when an alkali such as sodium carbonate is employed, it is advisable to add an equivalent concentration of an acid substance, such as ammonium chloride or hydrochloric acid, later in the process. If desired, a basic compound containing groups reactive with formaldehyde, such as ammonia, may be employed in the same manner. However, extreme care must be taken in order to add enough formaldehyde to give the methylol amide the most desirable curing properties without precipitating the methylol amide.

If less than 0.7 mole of formaldehyde per each equivalent of nitrogen-containing compound bearing an NH group is added to the aqueous amide adduct, the heat-cured methylol amide has poorer water resistance and detergent resistance. In fact, the water resistance and detergent resistance is in some cases only slightly better than that of the comparable amide adduct, which has not been reacted with formaldehyde. Generally speaking, the methylol amides which have not been treated with a sufficient concentration of formaldehyde are best suited for uses where the curing characteristics of the methylol amide are relatively less important, such as in starch warp sizing compositions.

After the formaldehyde reaction, the resultant methylol amide adduct is neutralized or made basic by the addition of a suitable basic material, preferably ammonium hydroxide or a volatile amine. Any precipitated methylol amide is thereby redispersed.

Non-volatile alkali is not preferred because, as pointed out above, the cured products have poorer water resistance and detergent resistance. Diamines, such as ethylene diamine, are advantageously employed with ammonia in order to give the cured products a somewhat softer, more flexible character.

HEAT CURING METHYLOL AMIDES

The various methylol amides of this invention fall into roughly two classes, which are (1) those methylol amides which have relatively poor heat-curing properties due to such factors as a low level of potentially reactive carboxy groups, reaction with an insufficient concentration of formaldehyde or the use of a non-volatile alkali to neutralize or redissolve the methylol amide precipitate and (2) those methylol amides which have good heat-curing properties. Of these, the latter are preferred, although both groups are useful as indicated before. The preferred, heat-curing methylol amides are adducts of maleic anhydride or maleic acid with ethylenically unsaturated carboxylic acid esters of polyhydric alcohols (preferably naturally occurring glyceride oils such as linseed oil or soybean oil) which contain from about 2 to 9 potentially reactive carboxy groups per molecule. The methylol amides based on the long chain fatty acid esters of polyhydric alcohols having esterified ethylenically unsaturated fatty acid chains of from 10 to 24 carbon atoms are soluble in aqueous ammoniacal solutions when said adducts contain on an average at least about 1 potentially reactive groups per each esterified fatty acid chain of from 10 to 24 carbon atoms.

As pointed out above, completely cured adducts containing about 2-4 (preferably 3-4) potentially reactive carboxy groups have an oily or tacky surface, which makes them useful as non-woven binders for industrial dirt or dust wiping cloths. Non-woven dust-wiping cloths based on methylol amides having less than 3 potentially reactive carboxy groups are decidedly inferior in strength and in blocking characteristics to wiping cloths based on methylol amides having three or more potentially reactive carboxy groups. Best results have been obtained when the non-woven wiping cloth is based on a methylol amide containing 3.5-4 potentially reactive carboxy groups per molecule.

Fully cured methylol amides having from about 5 to 7 potentially reactive carboxy groups per molecule have the best combination of tensile strength, flexibility, water-resistance, detergent-resistance, organic solvent resistance and freedom from tack or oiliness. These adducts are useful as non-woven binders, backings for carpets, automobile upholstery, etc.; as the principal vehicle for paints or paint primers; as nylon or polyester tire cord adhesives, as water-proofing top coats for awnings; as water-proofing additives to starch and polymer latices (polyvinyl acetate for example); ink vehicles; lubricants for rolling steel that on curing serves as corrosion resistant coatings, etc.

Cured methylol amides having on an average about nine potentially reactive carboxy groups per molecule are too brittle for some uses, but the flexibility can be improved by adding unsaturated fatty acids, such as oleic acid or tall oil acids, to the methylol amide either before or after the maleation step.

The various heat-curing methylol amides can be cured completely in less than 10 minutes at 150° C., 20 minutes at 140° C., and 40 minutes at 120° C. In general, these materials need temperatures in excess of 90° C. in order to get a complete cure, but somewhat less than complete cures can be attained at room temperature. For example, films cast from aqueous ammoniacal solutions of methylol amides, having from about 4.5 to 9 potentially reactive carboxy groups per molecule, will air dry to a tack free surface at room temperature in from about 15 minutes to 1 hour. These films have little water resistance or alkali resistance and are removed easily after standing at room temperature for a week or more. However, some of these films based on methylol amides having a high concentration of methylol amide groups have relatively good water resistance when allowed to stand for about two weeks or more.

Various catalysts, such as hexamethylene tetramine, ammonium p-toluene sulfonate, ammonium vanadate, ammonium molybdate, boric acid, can be added to the methylol amides in order to improve one or more of the following properties: (1) the color of the cured product, (2) the speed of cure, or (3) the hardness of the cured product.

The addition of reactive pigments, such as zinc chromate, to the methylol amide adduct results in a paint composition which air dries at room temperature to a water-resistant, detergent-resistant coating. Such paints also set immediately by plunging freshly painted panels into boiling water.

It has been pointed out above that the various methylol amides of this invention, which have relatively poor heat-curing properties, are suitable additives to warp-sizing compositions. However, the preferred methylol amides which have excellent heat curing characteristics are also preferred in this use, particularly for sizing hydrophobic fibers, such as polyester fiber (polyethylene terephthalate for example), nylon, polypropylene, and fiber glass.

A good warp-sizing agent forms a tenacious protective coating over the fiber thereby preventing the fiber from breaking during the weaving operation. Various lubricants are also added to the sizing composition to cut down friction during the weaving operation and thereby further reduce the possibility of the fiber breaking. While starch and its fractions (amylose and amylopectin) are excellent warp sizing agents for various natural fibers due to its good adhesion to the natural fiber, its poor adhesion to synthetic hydrophobic fibers limit its use. Nylon, for example, is usually sized with the much more expensive acrylic polymers. The preferred methylol amides of this invention have excellent adhesion to hydrophobic fibers and it has been found that starch sizing compositions containing these preferred methylol amides adhere tenaciously to hydrophobic fiber. Since the sizing agents are usually removed in alkaline desizing baths after weaving, the methylol amide is preferably incompletely cured, when the starch size is applied. If the sizing composition is completely cured, the methylol amide cannot be removed in conventional alkaline desizing baths. However, the sizing can be burnt off glass fibers.

The following examples are merely illustrative and should not be construed as limiting the scope of the invention.

EXAMPLE I

Eight hundred and eighty-four grams of bleached soybean oil (1 mole) was heated to 230° C. in a three-necked flask equipped with a stirrer, reflux condenser and addition port. After 294 grams (3 moles) of liquid maleic anhydride was added through the addition port over a period of one and one-half hours, the composition was heated to 250° C. and held there for 15 minutes. The maleated oil was cooled to about 50° C. and then 294.5 grams of water and 202.1 grams of aqueous ammonium hydroxide (3.1 moles ammonia) were added while maintaining the reactants at between 25-50° C. The reactants were stirred until the product was a clear solution. It was determined that about 15 percent of the potentially reactive carboxy groups (30% of the starting anhydride groups) had been converted to the amide form by distilling off ammonia from a slightly basic sample of the clear solution. Five hundred and fifteen grams of formalin (6.3 moles formaldehyde) were added rapidly to the amide adduct and the pH of the aqueous system dropped to about 5 to 5.5 precipitating the methylol amide as a water-insoluble hydrate. The water-insoluble hydrate was redissolved by slowly adding 223 grams of aqueous ammonium hydroxide (3.3 moles ammonia) while maintaining the exothermic reaction below about 50° C. Then 21.2 grams ethylene diamine (0.35 mole) and 52.0 grams aqueous hydroxide (0.77 mole of ammonia) were added to adjust the pH of the aqueous solution of methylol amide to a pH of 7.5–8.5.

The 60 percent by weight total solids aqueous solution of methylol amide of this example was applied to glass plates with a Bird applicator and cured at 150° C. for eight minutes. The results are set forth below in Table II.

The 60% by weight total solids aqueous solution of methylol amide of this example was applied as a 1.5 mil film to a series of glass plates and cured in the manner indicated below in Table IV. Each of these films were subjected to a series of spot tests. The results are set forth below in Table IV.

TABLE IV

| | Film Cures= | | | | | | | | | | | |
|---|---|---|---|---|---|---|---|---|---|---|---|---|
| | 4 Min. Time | 120° C. Effect | 8 Min. Time | 120° C. Effect | 15 Min. Time | 120° C. Effect | 4 Min. Time | 150° C. Effect | 8 Min. Time | 150° C. Effect | 15 Min. Time | 150° C. Effect |
| 0.5% Dash Detergent | 18 min | T | 50 min | T | + 4 hr | R | 105 min | T | + 4 hr | R | + 4 hr | N |
| 0.5% Ivory Soap | 18 min | T | 50 min | T | +4 hr | R | 105 min | T | + 4 hr | R | + 4 hr | N |
| CCl₄ | 3 min | T | + 4 hr | E | + 4 hr | E | + 4 hr | E | + 4 hr | E | + 4 hr | N |
| 2% HCl | 18 min | T | + 4 hr | C | + 4 hr | N | + 4 hr | C | + 4 hr | N | + 4 hr | N |
| 2% H₂SO₄ | 15 min | T | + 4 hr | C | + 4 hr | N | + 4 hr | C | + 4 hr | N | + 4 hr | N |
| Tap Water | 20 min | T | + 4 hr | C | + 4 hr | N | + 4 hr | C | + 4 hr | N | + 4 hr | N |
| Bleach | 18 min | T | 30 min | T | 50 min | T | 38 min | T | + 3 hr | T | + 4 hr | T |
| Perchloroethylene | 3 min | T | 4 hr | E | 4 hr | E | 30 min | T | 4 hr | E | 4 hr | E |

KEY: T=Through the Film; R=Raised; E=Etched; C=Colored; N=No Effect.

The above table indicates that the methylol amides of this invention can be cured under varying conditions to form water-resistance, detergent resistance, organic solvent resistant coatings. The table also indicates that the degree of resistance is dependent upon the cure temperature and cure time.

TABLE II

| Test | Film Thickness in mils | |
|---|---|---|
| | 1.5 mil | 2 mil |
| Tensile Strength, p.s.i. | 850 | 875 |
| Tensile Modulus, p.s.i. | 12,800 | 40,700 |
| Percent Elongation | 34 | 39 |
| Weight Loss after 300 Revolutions on Taber Abrasor, mg. | 35 | 35 |
| Sward Hardness | 14 | 14 |

EXAMPLE II

Eight hundred and eighty-four grams of bleached soybean oil (1 mole) was heated to 230° C. in a three-necked flask equipped with a stirrer, reflux condenser and addition port. After 294 grams (3 moles) of liquid maleic anhydride was added through the addition port over a period of one and one-half hours, the composition was heated to 250° C. and held there for 15 minutes. The maleated oil, cooled to about 50° C., was then added to 700 grams of aqueous ammonium hydroxide (6 moles ammonia) while maintaining the reactants at between 25–50° C., thereby dissolving the maleated oil. It was determined that about 42.5% of the potentially reactive carboxy groups (85% of the starting anhydride groups) had been converted to the amide form by distilling off ammonia from slightly basic sample of the solution. Five hundred and fifteen grams of formalin (6.3 moles formaldehyde) were added rapidly to the solution and the pH of the aqueous system dropped to about 5 to 5.5 precipitating the methylol amide as a water-insoluble hydrate. The water-insoluble hydrate was redissolved by slowly adding 143 grams of aqueous ammonium hydroxide (2.1 moles ammonia) while maintaining the exothermic reaction at about 50° C. The solution had a pH of about 7. Then 21.2 grams ethylene diamine (0.35 moles) and 52.0 grams aqueous ammonium hydroxide (0.77 mole ammonia) were added to adjust the pH of the aqueous solution of methylol amide to a pH of 7.5–8.5.

The 60% by weight total solids aqueous solution of methylol amide of this example was applied to glass plates with a Bird applicator and cured at 150° C. for eight minutes. The results are set forth below in Table III.

TABLE III

| Test | Film Thickness in mils | |
|---|---|---|
| | 1.5 mil | 2 mil |
| Tensile Strength, p.s.i. | 1,300 | 1,400 |
| Tensile Modulus, p.s.i. | 40,000 | 44,000 |
| Percent Elongation | 18 | 14 |
| Weight Loss after 300 Revolutions on Taber Abrasor, mg. | 19 | 19 |
| Sward Hardness | 16 | 16 |

EXAMPLE III

This example illustrates the preparation of a maleated oil suitable for use as a non-woven binder for industrial dusting cloths. The methylol amide was prepared by the method of Example I by reacting in order 884 grams of bleached soybean oil (1 mole), 150 grams maleic anhydride (1.53 mole), 258.5 grams water, 177.8 grams aqueous ammonium hydroxide (2.6 moles ammonia), 452.9 grams formalin (5.6 moles formaldehyde), 204 grams aqueous ammonium hydroxide (3 moles ammonia), 18.6 grams ethylene diamine (0.3 mole) and 45.5 grams aqueous ammonium hydroxide (0.7 moles ammonia).

The 60% by weight total solids aqueous solution of methylol amide having on an average about 3 potentially reactive carboxy groups per glyceride molecule was applied to a glass plate with a Bird applicator and cured at 150° C. for eight minutes. The film was soft, oily, water-resistant and had little tensile strength.

EXAMPLE IV

Example III was repeated except that the concentration of maleic anhydride was increased to 1.85 moles. This product which contained on an average about 3.7 potentially reactive carboxy groups per molecule was better suited for use as a non-woven binder for industrial dusting cloths because of the cured product's decidedly better tensile strength.

EXAMPLE V

Example III was repeated except that the concentration of maleic anhydride was decreased to 1.1 moles. This product, which contained on an average about 2.2 potentially reactive carboxy groups per molecule, was inferior to the product of Example III as a binder for non-woven industrial wiping cloths since the methylol amide was water-dispersible and not water-soluble and the cured product had virtually no strength and tended to block.

EXAMPLE VI

A maleated oil was prepared by the method of Example I using 2,500 grams bleached soybean oil (2.83 moles) and 1,232 grams maleic anhydride (12.54 moles). Three hundred grams of this maleated oil (0.23 mole oil) having on an average about 8.8 potentially reactive carboxy groups per molecule (4.4 anhydride moieties per molecule) was mixed with 200 grams of water and then sparged with ammonia gas until the maleated oil dissolved and the reaction mixture had a pH of about 7; the temperature of the reaction mass reaching a peak temperature of about 77° C. The reaction mass was cooled to 50° C. and then 100 grams of formalin (1.27 moles formaldehyde) was added precipitating the methylol amide as a hydrate. The methylol amide was redissolved by sparging the reaction mixture with ammonia gas until the aqueous solution had a pH of 7.5. A 1.5 mil film of this material was prepared in the manner described in Example I. This film was extremely hard, water-resistant, detergent-resistant, but somewhat brittle.

EXAMPLE VII

Eight hundred grams of maleated soybean oil prepared by the method of Example VI having on an average 4.4 anhydride moieties per molecule and 800 grams of maleated soybean oil prepared by the method of Example III having on an average 1.5 anhydride moieties per molecule were mixed with 1,400 grams water and sparged with ammonia until the maleated oil dissolved. Four hundred and fifty grams formalin (5.55 moles formaldehyde) were then added precipitating the methylol amide as a cloudy material. The methylol amide was redissolved by sparging with ammonia gas until the aqueous solution had a pH of about 7.5. A cured film was prepared from this composition in the manner described in Example I. The cured film did not have the brittleness of the product of Example VI nor the oiliness of the product of Example III. Instead the cured film had properties similar to the films prepared in Example I.

EXAMPLE VIII

Eight hundred and eighty-four grams of linseed oil (1 mole) was reacted with 294 grams maleic anhydride (3 moles) in the manner described in Example I. The methylol amide was prepared by the method of Example I by reacting in order 125 grams of maleated linseed oil (0.106 mole) having on an average about 6 potentially reactive carboxy groups per molecule (3 anhydride moieties), 27 grams water, 22.5 ml. aqueous ammonium hydroxide (0.32 mole ammonia), 47.0 ml. formalin (0.64 mole formaldehyde), 22.5 ml. aqueous ammonium hydroxide (0.32 mole ammonia), 1.7 grams ethylene diamine (0.03 mole) and 10.5 ml. aqueous ammonium hydroxide (0.15 mole ammonia). An aqueous solution of the methylol amide was applied to a glass plate as a 2 mil film and cured at 150° C. for eight minutes. The film had excellent water-resistance, detergent-resistance, flexibility, tensile strength and hardness.

EXAMPLE IX

Example I was repeated except that the maleated soybean oil was added to 496.6 grams of aqueous ammonium hydroxide (3.1 moles ammonia) instead of adding 294.5 grams water and 202.1 grams of aqueous ammonium hydroxide (3.1 moles ammonia) to the maleated soybean oil. It was determined that about 22.5% of the potentially reactive carboxy groups (45% of the starting anhydride groups) had been converted to the amide form. Cured methylol amides based on the product of this example were similar to the cured methylol amides based on the product of Example I.

EXAMPLE X

Example IV was repeated except that the starting glyceride oil composition was 174 grams linseed oil and 710 grams soybean oil.

EXAMPLE XI

This example illustrates that the methylol amides of this invention are suitable vehicles for paints. The methylol amides of Examples I, II, IX and X were all tested in the following formulation:

|  | Pounds |
|---|---|
| Red Iron Oxide R–8098 (C. K. Williams Co.) | 150 |
| Barytes W–1430 VVF (C. K. Williams Co.) | 150 |
| USP–400 [1] (minerals+pigments—Phillips Corp.) | 150 |
| Methylol amide (60% total solids) | 375 |
| Water | 295 |

[1] A magnesium silicate extender.

The paints were prepared by mixing all of the pigment with the methylol amide and then placing on a three-roll mill. After one pass on the roll mill, the dispersions had a North Fineness of Grind of 7. The pigment pastes were allowed to stand for 24 hours and then diluted with water to spray viscosity of from 18–24 seconds as measured in a No. 4 Ford Cup. The paints were sprayed on cold-rolled steel and Bonderite 100 (zinc phosphate coated) steel panels, flash-dried for thirty minutes, baked at 350° F. for 20 minutes and then sanded to a dry film thickness of between 0.8 and 1.2 mils. The panels were then topcoated with Ford Cotor Company M30J Black Enamel and flash dried for thirty minutes. The panels (in duplicate) were then exposed to 90° F. distilled water for 500 hours and tested for impact resistance. The results are below in Table V.

TABLE V

| Methylol Amide of Example | 500 Hours—90° F. Water Test | | | | Direct Impact Primer+Topcoat Bonderite |
|---|---|---|---|---|---|
| | Primer Alone | | Primer+Topcoat | | |
| | Cold-Roll | Bonderite | Cold-Roll | Bonderite | |
| I | Failed 288 hours | Sl. discoloration | Fine blisters; loss of gloss. | Fine blisters; loss of gloss. | >45″ lbs. |
| II | Sl. discoloration | Excellent | Pinholes | Very good | >45″ lbs. |
| IX | Failed 288 hours | Sl. discoloration | Fine blisters | Fine blisters | >45″ lbs. |
| X | Failed 500 hours | Very good | do | Very good | >45″ lbs. |
| Ford Motor Co. Primer | Excellent | Excellent | Pinholes | Pinholes | >45″ lbs. |

The data in Table V indicates the methylol amides of this invention are all suitable for use as paint vehicles with the methylol amide of Example II being best, followed by the methylol amide of Example X, the methylol amide of Example IX and the methylol amide of Example I.

Panels coated with paints based on the methylol amides of Examples II and X, which had passed the stringent Ford Motor Company 500 hour—900° F. water test, were then subjected to 250 hours of salt-fog exposure. The fogged panels had higher impact resistance than fogged panels based on the Ford Motor Company primer.

EXAMPLE XII

Example I was repeated except that the 884 grams of soybean oil was replaced by a mixture of 663 grams of soybean oil and 210 grams of tall oil fatty acids. Cured films based on the methylol amide composition of this example had better flexibility than those based on the methylol amide of Example I.

EXAMPLE XIII

Example I was repeated except that the 884 grams of soybean oil was replaced by 840 grams of tall oil fatty acids (3 moles). Cured films based on the methylol amide of this example were quite similar (soft, flexible, low strength) to the films prepared from the methylol amide of Example III and IV.

EXAMPLE XV

This example illustrates the preparation of a methylol amide using ethanol amine instead of ammonia. One hundred grams of a maleated soybean oil (0.085 mole) having on an average 6 potentially reactive carboxy groups per molecule (3 anhydride moieties per molecule) was reacted in order with 25 grams water, 8.1 grams ethanolamine at 100° C., 43 grams of formalin (0.5 mole formaldehyde) at 60° C. and 11.2 grams of ethanolamine. A 1.5 mil film cured at 150° C. for ten minutes had good water-resistance and detergent resistance.

EXAMPLE XVI

This example illustrates that the methylol amides of this invention can contain chloro and hydroxyl groups. One hundred grams of a maleated soybean oil (0.085 mole) having on an average 6 potentially reactive carboxy groups per molecule (3 anhydride moieties per molecule) was treated with 50 ml. of a saturated aqueous Halane solution (1,3-dichloro-5,5-dimethylhydantoin) which reacted at the double bonds of the maleated soybean oil to form vicinal chlorohydroxy groups. The aqueous composition was sparged with ammonia gas until the reaction medium was neutral. The amide adduct was precipitated from solution in the form of the methylol amide by the addition of 30 ml. of formalin and then redissolved by sparging with ammonia gas until a pH of 7 was reestablished. A 1.5 mil film cured at 150° C. for 10 minutes had good water-resistance, detergent resistance, flexibility and tensile strength. It was similar to the cured film prepared in Example I.

A somewhat softer film resulted when the saturated Halane solution was replaced by 30 ml. of 4.1 titer chlorine bleach. The softness was probably due to the sodium ions in the bleach.

EXAMPLE XVII

This example illustrates the preparation of a methylol amide using hexamethylenetetramine. Three hundred and ninety-two grams of a maleated soybean oil (0.33 mole) having on an average 6 potentially reactive carboxy groups per molecure (3 anhydride moieties per molecule), 90 grams of hexamethylene tetramine (0.64 mole) and 300 ml. of water were heated at 70° C. until a cloudy product having a pH of 5.5–6.0 was formed. During the heating at least part of the hexamethylene tetramine broke down into ammonia and formaldehyde, which was indicated by the liberation of formaldehyde vapors, ammonia vapors and the partial dispersion of the amide adduct. The product dissolved completely on the addition of 20 ml. of ammonium hydroxide, which brought the pH of the methylol amide composition to 7. A 1.5 mil film cured at 150° C. for ten minutes was softer than the cured film of Example I. Further, when a cured film of Example I and a cured film of this example were immersed in water, the film prepared from the product of this example had absorbed water and softened noticeably after two hours. On the other hand the cured film based on the product of Example I was still clear and hard after over 100 hours. Apparently the product of this example does not cure as fully as the products prepared by the preferred route.

EXAMPLE XVIII

This example illustrates that hexamethylene tetramine is not a suitable source of both ammonia and formaldehyde in the absence of water. One hundred and twenty-five grams of a maleated soybean oil (0.11 mole) having on an average 6 potentially reactive carboxy groups per molecule (3 anhydride moieties per molecule) and 25 grams hexamethylene tetramine (0.18 mole) were mixed together and heated in an autoclave at 115° C. A small sample smelling strongly of formaldehyde was cooled to room temperature. This sample was dark and insoluble in water. Six ml. of water was added to the hot autoclave and a violent frothing started. The exothermic reaction raised the reaction temperature to 122° C. One hundred and forty-four ml. of water were added to the cooled adduct which dissolved when the aqueous medium was adjusted to pH 7.

EXAMPLE XIX

This example illustrates that the product prepared by the method of Example 8 of U.S. Patent 2,188,890 is completely unlike the products of this invention. Seventy grams of a maleated soybean oil (0.07 mole) having on an average 3.7 potentially reactive carboxy groups per molecule (1.85 anhydride moieties per molecule), 14 grams hexamethylene tetramine (0.1 mole) and 46 grams of commercial xylenols were heated slowly in a stainless steel resin kettle to 150° C. The reaction started slowly as evidenced by bubbling and evolution of steam. A sample was taken and allowed to cool to room temperature. The sample was a tough pliable resin which was insoluble in aqueous ammonium hydroxide. The main reaction products were slowly heated to 200° C. until a vary hard resin solidified which was insoluble in aqueous ammonium hydroxide. Neither of the reaction products of this example had the water-dispersibility of the products of my invention.

EXAMPLE XX

This example illustrates the preparation of a methylol amide based on a pentaerythritol tetraester of soybean oil fatty acids. The pentaerythritol tetraester of soybean oil fatty acids was prepared by refluxing 15 grams of pentaerythritol tetraacetate (0.049 mole) and 58.4 grams of soybean oil methyl esters (0.21 mole) in the presence of 1.05 grams sodium methoxide. The stripped pentaerythritol tetraester of soybean oil acids had a hydroxyl value of 0.3 milliequivalent per gram and saponification value of 179.

Twelve and six-tenths grams of pentaerythritol tetraester of soybean oil acids (0.01 mole) and 3.9 grams of maleic anhydride (0.04 mole) were heated at 230° C. for one hour under reflux. The product was stripped and then cooled. It contained on an average 1.5 maleic anhydride moieties per molecule. The product was then dispersed in aqueous ammonium hydroxide, which contained 0.08 mole ammonia; precipitated with 0.08 mole formalin; and neutralized to pH 8.5 with aqueous ammonium hydroxide in the manner described in Example II. The resulting aqueous dispersion was a clear red brown, viscous fluid.

A 3 mil film of the methylol amide of this example was prepared in the manner described in Example I except that the film was heated at 150° C. for ten minutes. The soft, flexible film was similar to the film prepared in Example IV.

A somewhat harder film resulted when a 10 gram sample of the 60% by weight dispersion was compounded with lead naphthenate (.0067% by weight lead based on the weight of the dispersion), manganese naphthenate (.0067% by weight manganese based on the weight of the dispersion) and cobalt naphthenate (.0067% by weight cobalt based on the weight of the dispersion), applied to a glass plate and then cured at 150° C. for ten minutes. A very hard film resulted when the above driers were replaced with ferric naphthenate (.02% by weight iron based on the weight of the dispersion).

EXAMPLE XXI

This example illustrates the preparation of a methylol amide based on an isomerized glyceride oil. Example II was repeated except that the starting glyceride oil was isomerized by heating at 230° C. for two hours with 2% anthraquinone based on the weight of oil and then filtered in order to remove the anthraquinone. The spectral absorption of the soybean oil at 2,350 millimicrons (diene structure) increased from 0.4 to 18.4 indicating that approximately 30% of linoleic acid moieties in the soybean oil had been conjugated.

A film prepared in the manner described in Example I was harder than a film based upon the methylol amide of Example II.

EXAMPLE XXII

This example illustrates the use of itaconic acid in place of maleic anhydride. One hundred and sixty grams of soybean oil (0.18 mole) and 73 grams of itaconic acid (0.56 mole) were heated with stirring to 170° C. until the evolution of water vapor stopped, which indicated that the itaconic acid had been converted to the anhydride form. The temperature was slowly increased to 225° C. over a 1½ hour period and then held at 225° C. for two hours. On cooling a dark resinous material settled from the oil phase and the supernatant oil phase was separated. The oil adduct contained on an average 0.9 mole of maleyl moieties per molecule or 1.8 potentially reactive carboxy moieties per molecule. The product was then dispersed in aqueous ammonium hydroxide, which contained 0.36 mole ammonia; precipitated with 0.36 mole formalin; and neutralized to pH 8.0 with aqueous amonium hydroxide in the manner described in Example II.

This product when cured on glass at 150° C. produced a hard brittle, water-insoluble film. The surface of the film was oily, which indicated that the product was not completely homogeneous.

EXAMPLE XXIII

This example illustrates the preparation of a preferred heat curable methylol amide where the maleated oil is kept in solution during all the processing steps. Two hundred grams of a maleated soybean oil (0.17 mole) having on an average 6 potentially reactive carboxy groups per molecule (3 anhydride moieties per molecule) were dissolved in 120 grams of aqueous ammonium hydroxide (1.02 moles amonia) while maintaining the reaction vessel below 50° C. After 44.2 ml. of a 25% by weight of aqueous trimethyl amine (0.3 mole) was added to buffer the aqueous amide adduct, 75.6 ml. of formalin (1.02 moles formaldehyde) were added. The aqueous solution had a pH of 6.3 after the addition of formaldehyde was complete. The pH of the solution was then adjusted to 8 with aqueous ammonium hydroxide. A cured film was prepared from the methylol amide of this example by heating a coated glass plate at 150° C. for ten minutes. The film had the same properties as a film based on the methylol amide of Example II except that the film from this example was somewhat lighter in color.

EXAMPLE XXIV

Example XXIII was repeated with essentially the same results except that the aqueous trimethyl amine and formaldehyde were mixed together and added in a single step.

EXAMPLE XXV

The method employed in Example XXIII was repeated except that the trimethyl amine was replaced by 0.125 mole of an inorganic alkaline material. The results are set forth below in Table VI.

TABLE VI

| Alkali | Properties of methylol amide films after heating at 150° C. for 10 minutes |
|---|---|
| NaOH | Each of the films had essentially the same properties as the film based upon the methylol amide of Example XXIII except that the films were water sensitive. |
| Na₂CO₃ | |
| K₂CO₃ | |

The water-sensitivity of these films was overcome by adding an equivalent amount of an acid producing salt, such as an amine hydrochloride or ammonium chloride, to the aqueous methylol amide after the addition of formaldehyde and ammonium hydroxide. The pH of the system was then adjusted to 8 with aqueous ammonium hydroxide. The results are set forth below in Table VII.

TABLE VII

| Moles inorganic alkaline material | Moles acid producing salt | Properties of methylol amide films after heating at 150° C. for 10 minutes |
|---|---|---|
| 0.125 NaOH | 0.125 NH₄Cl | Water-insoluble films similar to the film based upon the methylol amide of Example XXIII except that these films are somewhat harder. |
| 0.125 Na₂CO₃ | 0.250 NH₄Cl | |
| 0.125 K₂CO₃ | 0.250 NH₄Cl | |

EXAMPLE XXVI

This example illustrates the preparation of some methylol amide compositions containing aqueous ammonium hydroxide soluble zinc salts which compositions will cure to water-resistant surfaces when cured at room temperature or with live steam. One hundred grams of an aqueous alkaline solution of the methylol amide of Example II (60% total solids) and 6 parts of a zinc salt (as indicated in Table VIII below) were applied to a steel plate and allowed to dry at room temperature for three hours. Each of the coatings were water-resistant and imparted superior corrosion resistance to the coated steel.

TABLE VIII.—ZINC SALT

Zinc chromate
Zinc Yellow (Zinc potassium chromate)
Ammonium Zincate

Essentially the same results were obtained by plunging the coated plate in boiling water.

EXAMPLE XXVII

This example illustrates an excellent paint primer which cures to a water-resistant film in 20 minutes at room temperature or in a few seconds when exposed to live steam. One hundred and thirty-three grams of the methylol amide of Example II (60% total solids) was formulated with 250 grams of the following aqueous pigment composition (60% total solids):

| | Dry weight (grams) |
|---|---|
| Red lead | 82.5 |
| Zinc yellow | 15.0 |
| Red iron | 1.5 |
| Mg silicate | 34.5 |
| Mica | 15.0 |
| Aluminum stearate | 1.5 |

The above paint was applied to a steel plate, allowed to dry for twenty minutes and then immersed in distilled water bath which was maintained at 90° F. After 360 hours, there was no deterioration in the surface of the paint or in the adhesion of the paint to the steel plate.

EXAMPLE XXVIII

This example illustrates the compatibility of the methylol amide of Example II with a number of commercially available polymers. The methylol amide of Example II (60% by weight total solids) and the various commercially available polymers were compounded on an "as is" basis and at 20% total solids. The compatibility of the various systems is set forth below in Table IX. In the table, the top line, or "A" line, represents the "as is" composition; the bottom line, or "B" line, represents the composition at 20% total solids. "I" stands for incompatible; "PC" stands for partly compatible; "C" stands for compatible; "T.S." for total solids and "*" stands for high viscosity.

TABLE IX

| | | Ratio of Methylol Amide of Example II to Polymer | | | | | | | | |
|---|---|---|---|---|---|---|---|---|---|---|
| | | 1:4 | | | 1:1 | | | 4:1 | | |
| | | Immediate | 8 Hrs. on Standing | 24 Hrs. at 125° F. | Immediate | 8 Hrs. on Standing | 24 Hrs. at 125° F. | Immediate | 8 Hrs. on Standing | 24 Hrs. at 125° F. |
| Darex 61L (55.8% T.S.) | A | I | I | I | C | PC | PC | C | PC | PC |
| Polyvinyl Acetate | B | C | I | PC | C | PC | I | C | I | I |
| Elvacet 81-900 (55% T.S.) | A | C | I | I | C | PC | PC | C | PC | PC |
| Polyvinyl Acetate | B | C | C | C | C | I | I | C | I | I |
| Polycol-694 (55% T.S.) | A | C | I | I | C | I | I | C | I | I |
| Polyvinyl Acetate | B | C | C | PC | C | C | PC | C | PC | C |
| Pliolite Latex 140 (47.5% T.S.) | A | C | PC | I | C | C | C | C | C | PC |
| 40 Styrene-60 Butadiene | B | C | C | C | C | C | C | C | PC | C |
| Pliolite Latex 160 (48.9% T.S.) | A | C | C | I | C | PC | PC | C | PC | PC |
| 33 Styrene-60 Butadiene | B | C | C | C | C | C | C | C | PC | PC |
| Pliolite-440 (45% T.S.) | A | C | I | I | C | C | C | C | PC | PC |
| 35 Styrene-65 Butadiene | B | C | I | I | C | C | C | C | PC | PC |
| Dylex K-40 (48.9% T.S.) | A | C | PC | PC | C | C | C | C | C | C |
| 60 Styrene-40 Butadiene | B | C | C | C | C | C | C | C | C | C |
| Celanese VX-567 (50% T.S.) | A | C | C | PC | C | PC | I | C | PC | PC |
| Acrylate | B | C | C | C | C | C | C | C | C | C |
| Goodrich 450X3 (54.9% T.S.) | A | C | C | PC | C | PC | I | C | PC | PC |
| Polyvinyl Chloride-Acrylic | B | C | C | C | C | I | I | C | I | I |
| Hycar-1571 (41% T.S.) | A | C | C* | C* | C | C* | I | C | C* | C* |
| Acrylonitrile Butadiene | B | C | C | C | C | C | C | C | C | C |
| Hycar-2671 (50.3% T.S.) | A | C | C* | PC* | C | C* | PC* | C | C* | C* |
| Acrylate | B | C | C | C | C | C | C | C | C | C |
| Rhoplex HA-8 (46% T.S.) | A | C | C | C | C | C | PC | C | PC | PC |
| Acrylate | B | C | C | C | C | C | C | C | C | C |
| Rhoplex HA-16 (46% T.S.) | A | C | C | C | C | PC | PC | C | C | PC |
| Acrylate | B | C | C | C | C | C | C | C | C | C |
| Rhoplex AC-55 (55% T.S.) | A | C | PC* | PC* | C | C* | PC* | C | C | C |
| Acrylate | B | C | C | C | C | C | C | C | I | I |
| Shawinigan 0566 (50% T.S.) | A | C | C | C | C | PC | PC | C | PC | PC |
| Polyvinyl Butyral | B | C | C | C | C | PC | I | C | PC | I |
| Poly-EM | A | C | C | C | C | C | PC | C | PC | PC |
| Polyethylene | B | C | C | C | C | C | C | C | C | C |

Since many embodiments of this invention may be made and since many changes may be made in the embodiments described, the foregoing is to be interpreted as illustrative only and my invention is defined by the claims appended hereafter.

I claim:

1. The method of preparing a water-dispersible product which comprises reacting formaldehyde with an aqueous dispersion of an amide adduct of a maleyl compound and an aliphatic compound containing an ethylenically unsaturated chain of from 10 to 24 carbon atoms.

2. The method of claim 1, wherein said aliphatic compound containing an ethylenically unsaturated chain of from 10 to 24 carbon atoms comprises at least one compound selected from the group consisting of a fatty acid ester, fatty acid, fatty acid N-unsubstituted amide and fatty acid salt.

3. The method of claim 2, wherein said maleyl compound comprises at least one compound selected from the group consisting of maleic acid and maleic anhydride.

4. The method of claim 3, wherein said amide adduct comprises an ethylenically unsaturated fatty acid ester of a polyhydric alcohol containing on an average from about 2 to 9 potentially reactive carboxy groups per molecule.

5. The method of claim 4, wherein said ethylenically unsaturated fatty acid ester of a polyhydric alcohol comprises a glyceride oil.

6. The method of claim 4, wherein at least about 0.7 mole of formaldehyde is added per each equivalent of nitrogen containing compound having an N—H group.

7. The method of preparing a water-dispersible product which comprises the steps of (1) providing an adduct of a maleyl compound and an aliphatic compound containing an ethylenically unsaturated chain of from 10 to 24 carbons atoms, (2) reacting said adduct with a compound containing a basic nitrogen atom having at least two hydrogen atoms bonded to nitrogen selected from the group consisting of ammonia, amines and mixtures thereof, and then (3) reacting an aqueous dispersion of the reaction product of step (2) with formaldehyde.

8. The method of claim 7, wherein said compound containing a basic nitrogen atom comprises ammonia.

9. The method of claim 8, wherein said aliphatic compound comprises at least one compound selected from the group consisting of a fatty acid ester, fatty acid, fatty acid N-unsubstituted amide and fatty acid salt.

10. The method of claim 9, wherein said maleyl compound comprises at least one compound selected from the group consisting of maleic acid and maleic anhydride.

11. The method of preparing a water-dispersible product which comprises the steps of (1) providing an adduct of a maleyl compound selected from the group consisting of maleic anhydride and maleic acid and an aliphatic compound containing an ethylenically unsaturated chain of from 10 to 24 carbon atoms selected from the group consisting of a fatty acid ester, fatty acid, fatty acid N-unsubstituted amide and fatty acid salt, wherein said adduct contains on an average from about 2 to 9 potentially reactive carboxy groups per molecule, (2) reacting said adduct with ammonia and then (3) reacting an aqueous dispersion of the reaction product of step (2) with formaldehyde.

12. The method of claim 11, wherein at least about one-half mole of ammonia is added in step (2) per each potentially reactive carboxy group in said adduct.

13. The method of claim 12, wherein at least about 0.8 mole of formaldehyde is added in step (3) per each mole of ammonia added in step (2).

14. The method of claim 12, wherein at least about 0.7 mole of formaldehyde is added in step (3) per each equivalent of nitrogen containing compound bearing an N—H group.

15. The method of claim 14, wherein said aliphatic compound comprises a glyceride oil.

16. The method of claim 15, wherein at least about one mole of ammonia is added in step (2) per each potentially reactive carboxy group in said adduct.

17. The method of claim 12, wherein the adduct provided in step (1) is added to an aqueous ammonium hydroxide solution.

18. The method of preparing coated substrates which comprises the steps of (1) providing an adduct of a maleyl compound selected from the group consisting of maleic anhydride and maleic acid and an aliphatic compound containing an ethylenically unsaturated chain of from 10 to 24 acid ester, fatty acid, fatty acid N-unsubstituted amide and fatty acid salt, wherein said adduct contains on an average from about 2 to 9 potentially reactive carboxy groups per molecule, (2) reacting said adduct with ammonia, wherein at least about one-half mole of ammonia is added in step (2) per each potentially reactive carboxy group in said adduct, (3) reacting an aqueous dispersion of the reaction product of step (2) with formaldehyde, wherein at least about 0.7 mole of formaldehyde is added in step (3) per each equivalent of nitrogen compound bearing an N—H group in said aqueous dispersion, (4) applying a dispersion of the product of step (3) to a substrate and (5) drying said substrate.

19. The method of preparing a water-soluble product which comprises the steps (1) providing an adduct of a maleyl compound and an ester of a polyhydric alcohol with ethylenically unsaturated fatty acid chains of from 10 to 24 carbon atoms, wherein said adduct contains on an average at least about 1 potentially reactive carboxy group per each esterified fatty acid chain, (2) reacting said adduct with a compound containing a basic nitrogen atom having at least two hydrogen atoms bonded to nitrogen selected from the group consisting of ammonia, amines and mixtures thereof (3) reacting an aqueous solution of the reaction product of step (2) with formaldehyde.

20. The method of claim 19 wherein said compound containing a basic nitrogen atom comprises ammonia and said adduct contains at least 3 potentially reactive carboxy groups per molecule.

21. The method of claim 20 wherein said maleyl compound comprises a compound selected from the group consisting of maleic acid and maleic anhydride, at least about one-half mole of ammonia is added in step (2) per each potentially reactive carboxy group in said adduct and at least about 0.7 mole of formaldehyde is added in step (3) per each equivalent of nitrogen containing compound bearing an N—H group in said aqueous solution.

22. The method of preparing a water-soluble product which comprises the steps of (1) providing an adduct of a maleyl compound selected from the group consisting of maleic acid and maleic anhydride and a glyceride oil, wherein said adduct contain at least 3 potentially reactive carboxy groups per molecule, (2) reacting said adduct with ammonia, wherein at least about one-half mole of ammonia is added in step (2) per each potentially reactive carboxy group in said adduct, and (3) reacting an aqueous solution of the reaction product of step (2) with formaldehyde, wherein at least about 0.7 mole of formaldehyde is added in step (3) per each equivalent of nitrogen containing compound bearing an N—H group in said aqueous solution.

23. The method of claim 22, wherein said glyceride oil comprises soybean oil.

24. The method of claim 22, wherein said glyceride oil comprises linseed oil.

25. The method of claim 22, wherein said adduct contains on an average from 5 to 7 potentially reactive carboxy groups.

26. The method of preparing coated substrates which comprises the steps of (1) providing an adduct of a maleyl compound selected from the group consisting of maleic anhydride and maleic acid and an ester of a polyhydric alcohol with ethylenically unsaturated fatty acid chains of from 10 to 24 carbon atoms, wehrein said adduct contains on an average at least about 1 potentially reactive carboxy group per each esterified fatty acid chain but no less than about 3 potentially reactive carboxy groups per molecule, (2) reacting said adduct with ammonia, wherein at least about one-half mole of ammonia is added in step (2) per each potentially reactive carboxy group in said adduct, (3) reacting an aqueous solution of the reaction product of step (2) with formaldehyde, wherein at least about 0.7 mole of formaldehyde is added in step (3) per each equivalent of nitrogen containing compound bearing an N—H group in said aqueous solution, (4) applying a solution of the product of step (3) to a substrate and (5) drying said substrate.

27. The method of preparing coated substrates which comprises the steps of (1) providing an adduct of a maleyl compound selected from the group consisting of maleic acid and maleic anhydride and a glyceride oil, wherein said adduct contains at least 3 potentially reactive carboxy groups per molecule, (2) reacting said adduct with ammonia, wherein at least about one-half mole of ammonia is added in step (2) per each potentially reactive carboxy group in said adduct, (3) reacting an aqueous solution of the reaction product of step (2) with formaldehyde, wherein at least about 0.7 mole of formaldehyde is added in step (3) per each equivalent of nitrogen containing compound bearing an N—H group in said aqueous solution, (4) applying a solution of the product step (3) to a substrate and (5) drying said substrate.

28. The method of claim 27 wherein the substrate is dried at a temperature of at least 90° C.

29. A methylol amide having the structure

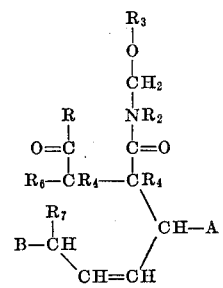

wherein

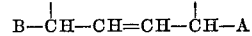

is a divalent aliphatic chain of from 10 to 24 carbon atoms; R is selected from the group consisting of

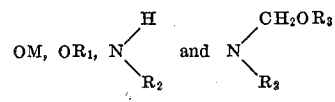

M is a cation; $R_1$, $R_2$ and $R_3$ are independently selected from the group consisting of hydrogen and alkyl; $R_4$ and $R_5$ are independently selected from the group consisting of hydrogen, halogen and lower alkyl; $R_6$ and $R_7$ are each selected from the group consisting of hydrogen and covalent bonds that taken together, complete a cyclohexene ring.

30. The compound of claim 29 wherein the divalent aliphatic chain of from 10 to 24 carbon atoms is submitted by a carboxylate group.

31. An aqueous dispersion of the compound of claim 29.

32. An aqueous dispersion of the compound of claim 30.

33. A methylol amide of an adduct of a maleyl compound and a long chain fatty acid ester of a polyhydric alcohol having an esterified ethylenically unsaturated fatty acid chain of from 10 to 24 carbon atoms.

34. A methylol amide of a maleated ethylenically unsaturated glyceride oil.

35. An aqueous dispersion of the compound of claim 34, wherein said compound contains on an average from 2 to 9 potentially reactive carboxy groups per molecule.

36. An aqueous solution of the compound of claim 34, wherein said compound contains an average of at least 3 potentially reactive carboxy groups per molecule.

37. The composition of claim 36 wherein said glyceride oil comprises soybean oil.

38. The composition of claim 36 wherein said glyceride oil comprises linseed oil.

References Cited
UNITED STATES PATENTS

| | | |
|---|---|---|
| 2,867,600 | 1/1959 | Coutras. |
| 3,123,578 | 3/1964 | Kraft. |
| 3,243,309 | 3/1966 | Phillips et al. ........ 106—264 |
| 3,293,058 | 12/1966 | Evans et al. ........ 106—253 |

DONALD J. ARNOLD, Primary Examiner

J. B. EVANS, Assistant Examiner

U.S Cl. X.R.

8—115.6; 106—2, 13, 14, 15, 17, 29, 70, 243, 244, 250, 252; 117—26, 135.5, 140, 161, 167; 252—8.8, 52, 88, 106, 152; 260—29.4, 32.4, 32.8, 33.6, 33.8, 39, 72, 89.7, 97.5, 404, 404.5, 557, 850

UNITED STATES PATENT OFFICE
CERTIFICATE OF CORRECTION

Patent No. 3,471,466                          October 7, 1969

Lester P. Hayes

It is certified that error appears in the above identified patent and that said Letters Patent are hereby corrected as shown below:

Column 1, line 39, "2,491,968" should read -- 2,941,968 --; line 43, beginning with "This application" cancel all to and including "filed Dec. 20, 1962." and insert the same at line 21, same column 1. Column 3, lines 65 to 67, the formula should appear as shown below:

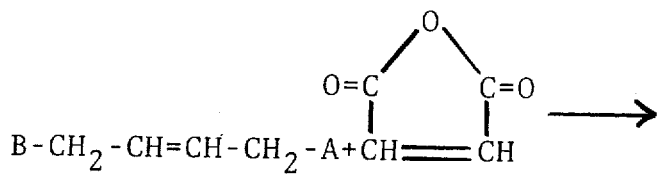

Column 4, lines 4 to 6, the formula should appear as shown below:

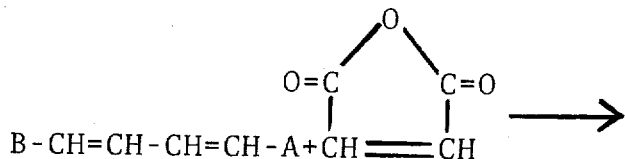

Column 5, line 7, "obtain" should read -- contain --; line 40, "molecule amide groups the higher" should read -- molecule. In general, the higher --. Column 14, line 10, "molybdate" should read -- molbydate --. Column 18, line 33, "Cotor" should read -- Motor --; line 58, "900° F." should read -- 90° F. --. Column 24, line 74, "10 to 24 acid" should read -- 10 to 24 carbon atoms selected from the group consisting of a fatty acid --. Column 26, lines 23 to 34, the formula should appear as shown below:

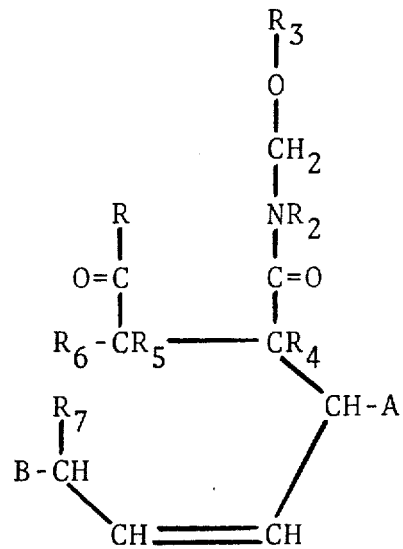

Signed and sealed this 16th day of June 1970.

(SEAL)
Attest:

EDWARD M. FLETCHER, JR.
Attesting Officer

WILLIAM E. SCHUYLER, JR.
Commissioner of Patents